E. T. BYSHE.
SCREW THREAD DIAMETER GAGE AND CHECK.
APPLICATION FILED MAY 17, 1917.

1,362,558.

Patented Dec. 14, 1920.

Witnesses:-
Leslie S. Baines.
E. L. B. Hamlin.

Inventor
Ernest T. Byshe
Per Wm. J. Herdman
Att'y.

UNITED STATES PATENT OFFICE.

ERNEST T. BYSHE, OF TORONTO, ONTARIO, CANADA, ASSIGNOR TO GREENFIELD TAP AND DIE CORPORATION, OF GREENFIELD, MASSACHUSETTS, A CORPORATION OF MASSACHUSETTS.

SCREW-THREAD-DIAMETER GAGE AND CHECK.

1,362,558.  Specification of Letters Patent.  Patented Dec. 14, 1920.

Application filed May 17, 1917. Serial No. 169,330.

*To all whom it may concern:*

Be it known that I, ERNEST T. BYSHE, a citizen of the Dominion of Canada, and a resident of Toronto, county of York, and Province of Ontario, Canada, have invented a new and useful Improvement in Screw-Thread-Diameter Gages and Checks, of which the following is a specification.

My invention relates to measuring gages and their associated checks and pertains specifically to gages either fixed or adjustable which are used to gage or measure the diameter of screw threads.

The principal object of my invention is to provide a screw thread diameter gage of such nature that it can be made accurately with ordinary manufacturing methods and one that can be easily maintained accurate during use. A further object consists in producing a gage that can be set or calibrated with a novel check of such form that perfect surfaces are presented by the check to the measuring tips of the gage.

I accomplish these and other very desirable advantages, which will hereinafter be pointed out and discussed, by providing an instrument having two male measuring tips or members, the longitudinal axes of which are in alinement and the form or contour of which is such as to allow the instrument when used to gage the diameter of a screw thread to be placed thereon with the longitudinal axis of the measuring tips perpendicular to the longitudinal axis of the threaded member.

In the drawings which accompany and form a part of this specification and in which like reference numerals designate corresponding parts throughout:

Figure 1:
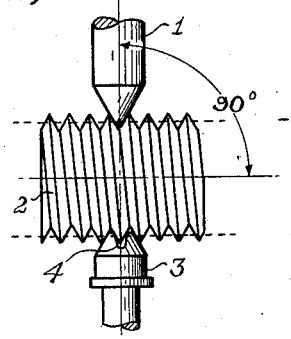
Figure 1 illustrates a portion of a screw thread with my improved measuring tips in position for gaging the pitch diameter of the thread.

Referring now to Fig. 1, a length of screw thread 2 is shown with a 60° full V thread, the pitch diameter of the thread being indicated by dotted lines. My improved measuring tips 1 and 3 are shown in position on the thread to correctly gage the pitch diameter of the threaded member, and it will be noted that the dotted line passing through the longitudinal axes of the measuring tips 1 and 3 is perpendicular to the longitudinal axis of the threaded member. Tip 1 is ground to a conical contour to fit a thread groove while tip 3 is provided with ground and lapped flat surfaces or preferably ground to have a conical contour to fit the groove presented by two thread teeth. A notch 4 is provided centrally in the tip 3 and is of such form as to clear the thread opposite the thread groove occupied by the measuring tip 1. Thus both tips in my improved gage engage the thread in the thread groove and as both are conical or pyramidal in form and are of such contour that their external surfaces engage the threaded member in the thread channel, the accuracy with which they fit the thread channel can obviously be readily observed.

It will be readily observed from the foregoing that both tip 1 and tip 3 being male members are adapted to engage the thread with their external surfaces and therefore as the tips wear with use they can be readily, easily and accurately re-ground and that they may be ground after tempering or hardening.

Figure 2:
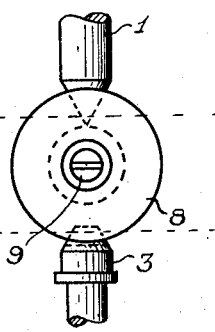
Fig. 2 is an end elevation of my improved check showing my improved tips in position thereon.
Figure 3:
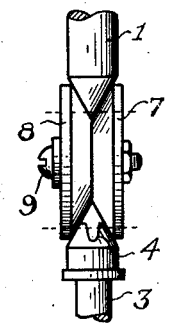
Fig. 3 is another view of the check shown in Fig. 2.

My improved check for setting or calibrating my improved gage is shown in Figs. 2 and 3 and comprises two disks 7 and 8 which are hardened and ground to the desired thread angle as shown and held with their beveled faces opposite each other by means of the bolt 9 to form a double female check, into which my improved tips 1 and 3 fit, as indicated in the drawing, for purposes of checking the gage. In the check illustrated I have purposely shown a check of the required size to check the accuracy of the gage at the setting used to measure the pitch diameter of the thread shown in Fig. 1 and have indicated this by extending the pitch lines in Fig. 1 to cross the tip members as they are shown in position on the check in Fig. 2. As the check is made of two male members 7 and 8 it is obvious that they may be ground to any desired angle and may be ground with extremely accurate and smooth surfaces by any ordinary mechanic and with ordinary precision tools. Further, it is obvious that the ease with which the check may be accurately made enables me to have a series of absolutely accurate checks for checking the gage at any desired point and thus errors in measurements due to errors in the screw in the case of a micrometer are eliminated.

Figure 4:
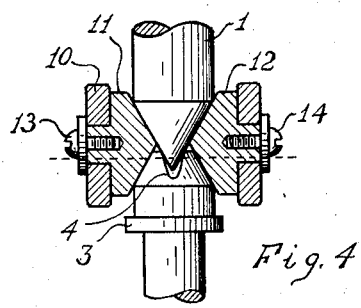
Fig. 4 is a sectional plan view of my improved zero check showing my improved tips in position thereon.
Figure 5:
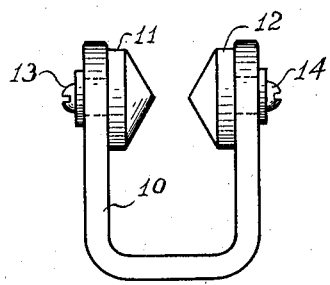
Fig. 5 is an elevation of the check shown in Fig. 4.
Figure 6:
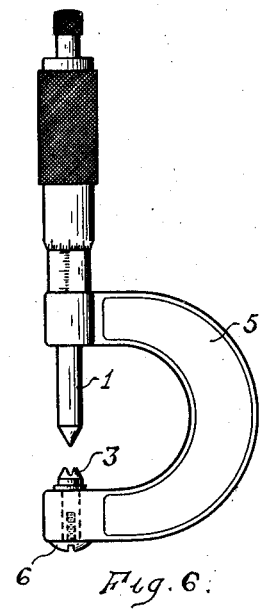
Fig. 6 is a plan view of a thread diameter micrometer equipped with my improved measuring tips.

In Figs. 4 and 5 I have illustrated the form of zero check necessary for use with my improved gage. This check comprises a pair of male check tips, preferably of conical form, 11 and 12 secured by means of screws as 13 and 14 respectively in a frame 10. An enlarged view of my improved tips 1 and 3 is shown in Fig. 4 in position on the check to set by gage for a zero reading. This form of check is necessary in my improved gage when the gage is used in the form of a micrometer for while the tip 1 will readily enter the recess 4 in the tip 3 it does not necessarily follow that the micrometer will read zero when the tip is screwed into full engagement with the notch 4. This is obvious and it is thought no further explanation of this is needed. In using my improved tips in a thread micrometer I prefer to swivel the tip 3 in the frame of the micrometer 5 and hold the same in position by means of a screw 6 as shown in Fig. 6. This manner of mounting the tip in the micrometer frame is in common use and needs no further explanation.

It will be noted from the foregoing that with my improved tips I may use a check of such nature as to be readily, easily and cheaply made accurate, that the form of the measuring tips themselves is such as to be easily, accurately and cheaply made and that they lend themselves to being easily kept accurate. That further as the tips are pyramidal or conical in shape they will enter the screw thread readily and that the accuracy with which they fit the thread is readily observed on the part of the user.

While I have shown but one embodiment of my idea it is to be clearly understood that I may modify the details thereof without departing from the spirit or narrowing the scope of my invention.

Having thus clearly illustrated and described my invention what I claim as new and desire to secure by United States Letters Patent is as follows:

In a thread diameter micrometer an anvil comprising a one piece member provided with an exterior contour conforming to a thread groove, a recess in said anvil adapted to clear one thread tooth to permit said anvil to engage work with the exterior surface of said anvil only, a spindle provided with an exterior contour conforming to a thread groove, and means supporting said anvil and said spindle with their longitudinal axes in alinement.

Signed by me at Ottawa, county of Carleton and Province of Ontario, in the presence of two witnesses.

ERNEST T. BYSHE.

Witnesses:
CHAS. G. ASHBY,
E. L. B. HAMLIN.